Oct. 13, 1953     L. A. RUBEN     2,655,068
CHORD-PLAYING HARMONICA
Filed Sept. 10, 1951     2 Sheets-Sheet 1
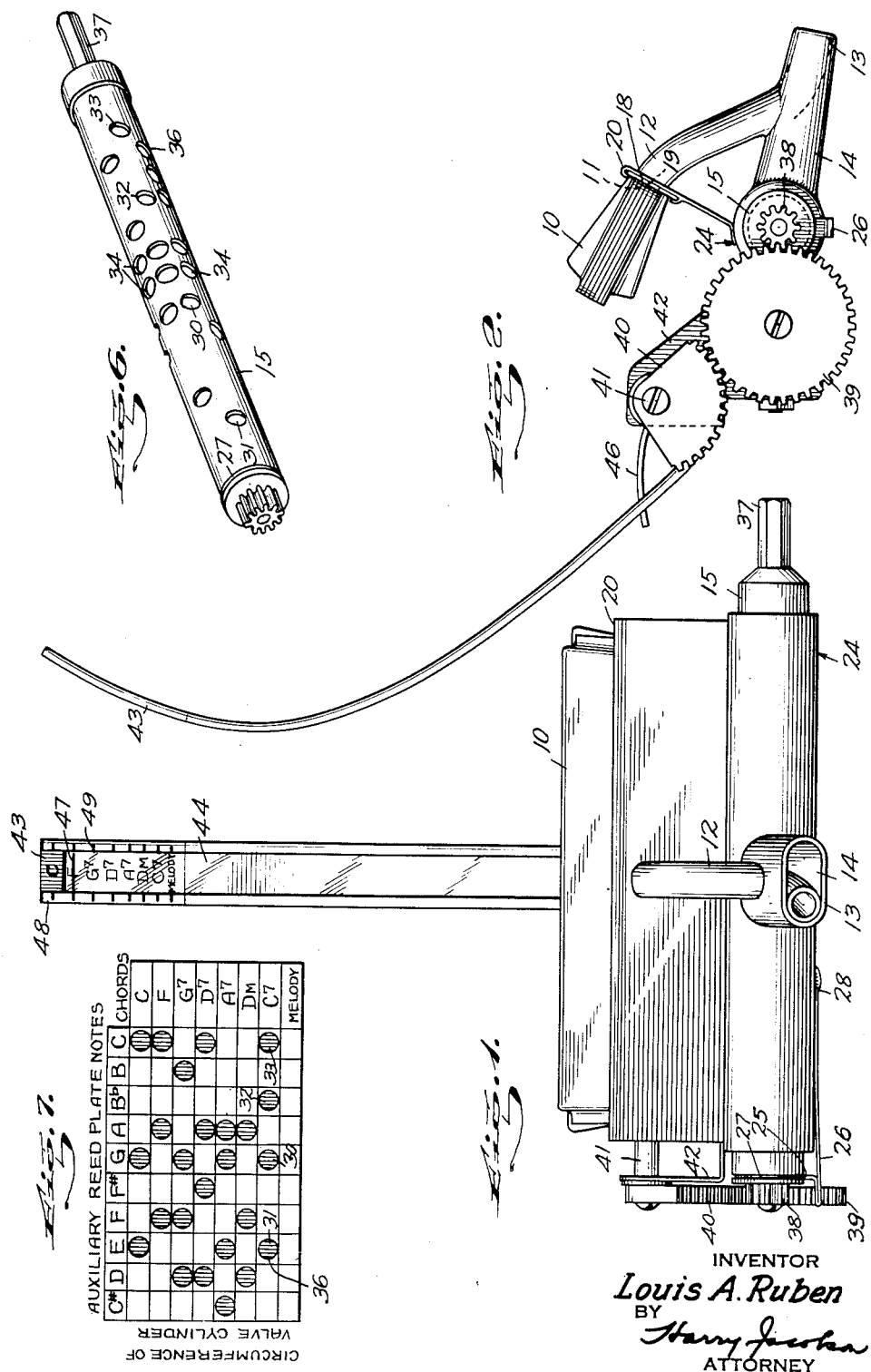
INVENTOR
*Louis A. Ruben*
BY
*Harry Jacobson*
ATTORNEY Oct. 13, 1953    L. A. RUBEN    2,655,068
CHORD-PLAYING HARMONICA
Filed Sept. 10, 1951    2 Sheets-Sheet 2
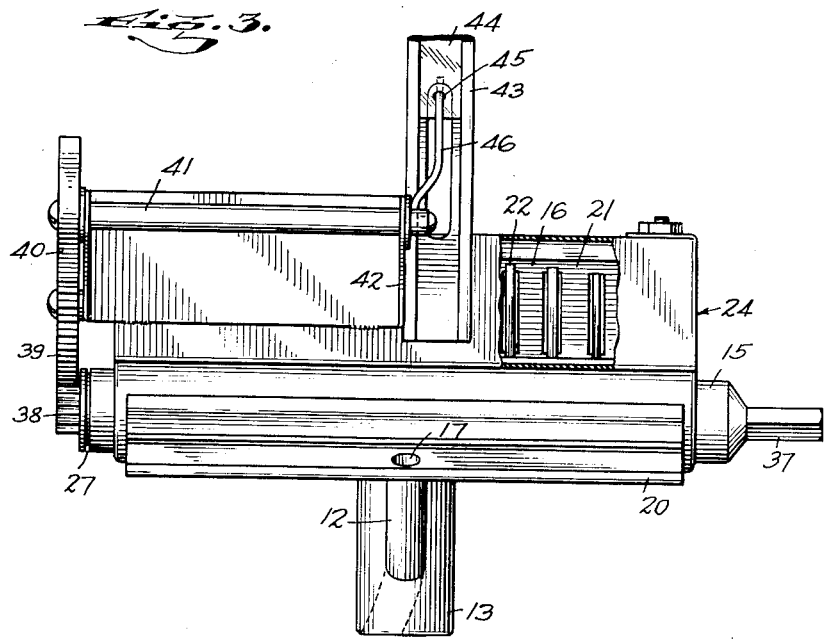
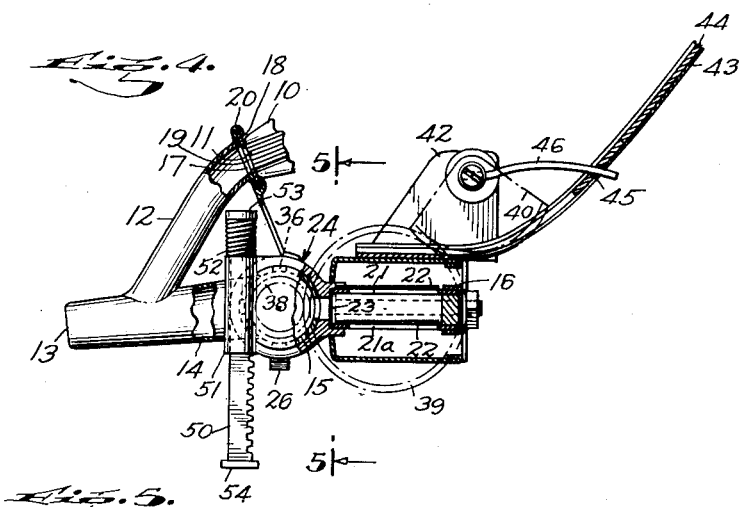
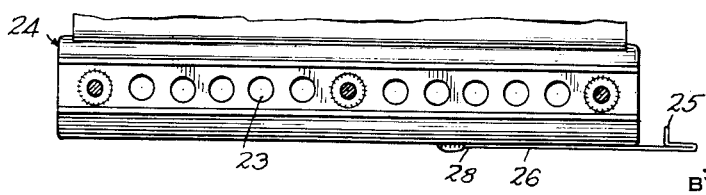
INVENTOR
*Louis A. Ruben*
BY
*Harry Jacobson*
ATTORNEY Patented Oct. 13, 1953

2,655,068

UNITED STATES PATENT OFFICE 2,655,068

CHORD-PLAYING HARMONICA

Louis A. Ruben, Bayonne, N. J.

Application September 10, 1951, Serial No. 245,828

7 Claims. (Cl. 84—377)

This invention relates to chord-playing harmonicas and particularly to the type wherein two harmonicas are employed to play the melody and an accompaniment.

Prior attempts to produce harmonicas which can be readily manipulated by an ordinary player not highly skilled, have been unsuccessful primarily because of the complicated mechanism employed, the division of the player's attention and efforts among various keys, buttons, slides or the like at the same time, and the difficulty of finding and operating the controls fast enough for practical purposes, even after long practice.

By providing the harmonica of the present invention with an indicator scale for any desired number of the most frequently used chords, using the chord names and not the individual designations of the notes making up the chord, and operatively connecting the indicator to a highly simplified and efficient automatic chord selector and sounder, the player need not have any experience or training whatever in playing chords to accompany the melody, but need merely manipulate the easily operated indicator to set it to indicate each of the desired chords in the proper succession while he continues to play the melody in the usual manner by blowing and drawing on the instrument. Setting the indicator to the proper single line on a clearly visible scale by a simple movement, simultaneously sets the chord selector into position to play the indicated chord. The common mouthpiece for both harmonicas of the instrument, as well as the arrangement of the parts, makes it possible to play the melody alone or chords alone, or both melody and accompanying chords at the same time, each single chord setting of the indicator sounding all of the proper notes of the selected chord automatically.

If one of the harmonicas of the instrument were provided with the full chromatic scale, the number of different chords which would become available to the player would be limited only by the size of the single movable selector member and by the efficiency of the manipulating mechanism therefor. However, for practical purposes, the complete chromatic scale is not needed nor employed, a selected part of such scale being usually sufficient to produce a wide range of the most commonly used chords.

The various objects of the invention will be clear from the description which follows and from the drawings, in which Fig. 1 is a front elevational view of the instrument.

Fig. 2 is a side elevational view thereof.

Fig. 3 is a top plan view thereof, partly broken away to show the fixed auxiliary or chord-playing reed plate.

Fig. 4 is a combined side elevational and sectional view of a slightly modified form of the instrument, wherein an operating plunger is provided to set the indicator and the valve cylinder simultaneously.

Fig. 5 is a fragmentary vertical sectional view taken on the line 5—5 of Fig. 4.

Fig. 6 is a perspective view of the valve cylinder.

Fig. 7 is a chart showing the relative arrangement of the holes in the valve cylinder and the designated reeds of the chord-playing harmonica.

In the practical embodiment of the invention shown by way of example, the harmonica 10 is of the usual type being provided with two reed plates to sound the notes of the diatonic scale by blowing and drawing on the usual openings for the reeds. The harmonica 10 is supported for sliding movement to carry the mouth openings 11 thereof past the branch 12 of the air-conducting mouthpiece 13 of the instrument, the other branch 14 leading to the valve cylinder 15 and thence to the auxiliary fixed harmonica 16. To support the harmonicas and the valve cylinder, the end of the mouthpiece branch 12 remote from the player carries a longitudinally extending channel 20, the otherwise imperforate bottom wall of which has a hole 17 therein communicating with the interior of said branch and with that one of the mouth openings 11 adjacent thereto as the harmonica 10 slides past the branch. A plate as 18 is secured to the edge of the harmonica 10 over the mouth openings 11 and is provided with a series of perforations 19 therein spaced apart the same distances as the openings 11 are spaced, the plate 18 being inserted into and sliding in the channel 20. The player blows into or draws in through the mouthpiece 13 and slides the harmonica 10 along the channel to carry the hole of the plate which registers with the selected mouth opening 11 to the hole 17 of the channel, thereby to play a melody or tune in about the usual manner. The channel 20 is preferably part of the supporting frame 24 of the instrument, the frame also supporting the valve cylinder and the fixed harmonica 16 in a manner soon to be described.

Said harmonica 16 is designed especially for the playing of an accompaniment in an easy effective and satisfactory manner, primarily involving the exposure of a plurality of the mouth openings 23 of the fixed harmonica at any one time through the medium of a single control element adapted for quick operation by a single finger of the player without materially withdrawing the attention of the player from the playing of the melody. The control element being in effect a multiple valve, the playing of a number of different chords is controlled by the element, a different chord being playable for each different position of the element. While for ideal chord playing, reeds or notes giving all the tones of the complete chromatic scale should be provided on the reed plate to permit the playing of a great number of possible chords of various note combinations, for practical purposes however, as has already been indicated, it is neither necessary nor advisable in a harmonica to employ the complete chromatic scale which is useful principally in instruments of this type for the playing of an accompaniment to a melody. The notes most frequently used in the playing of such chords have therefore been selected, suitable reed plates 21 and 21a which are substantially duplicates of each other carrying the reeds 22 of the fixed harmonica to produce said notes either on blowing or drawing in the breath. As shown by the chart of Fig. 7, ten tones have been selected as follows: C#, D, E, F, F#, G, A B♭, B and C. Selected combinations of certain of these tones enable the player to sound the following most frequently used chords: C⁷, F, C, G⁷, D⁷, A⁷ and Dm merely by setting an indicator at the corresponding point of a chord-indicating scale marked with the chord symbols mentioned. Setting of the scale indicator simultaneously sets the single control element above mentioned.

The rotary valve cylinder 15 constitutes said control element for all of the various chords, the cylinder being interposed between the branch 14 of the mouthpiece and the fixed chord-playing harmonica. The valve cylinder is hollow, is closed at both of its ends and its removably supported for rotation with a snug fit in the longitudinal cylindrical opening of the frame 24 to insure against material leakage therebetween. To maintain the cylinder in position against undesired longitudinal movement in the frame opening, while permitting free rotation thereof when required, the free end edge portion 25 of the strip spring 26 is inserted into the corresponding circumferential groove 27 (Fig. 1) in an end portion of the cylinder 15, the other end 28 of the spring being suitably secured to the frame 24. To free the valve cylinder for removal from its opening in the frame when desired, the yieldable end 25 of the spring is lifted out of the groove 27.

As best seen in Fig. 6, a number of circumferentially spaced apart lines of perforations are made in the side wall of the hollow cylinder 15. Each line of perforations is arranged longitudinally of the cylinder and comprises a number of perforations longitudinally aligned with each other and corresponding in number and positions to the number and positions of the notes of the fixed harmonica required to produce the desired chord, thereby to communicate with the proper mouth openings when the cylinder is rotated into the proper angular setting thereof. Since a considerable number of longitudinal lines as 36 of perforations are made through the wall of the cylinder to communicate with the interior thereof, a corresponding number of chords is provided for.

If desired, one narrow portion of the cylinder extending through the length thereof and wide enough to cover all of the mouth openings 23, may be left completely solid or imperforate for the purpose of blocking off all of said mouth openings 23 and thereby preventing the sounding of any chord when single notes of the slidable harmonica 10 or the melody only are to be played. That is, by rotating the cylinder until the imperforate portion thereof shown in Fig. 7 and marked "Melody" is at the mouth holes, the player may if he wishes, blow into or draw from both branches of the mouthpiece 13 without sounding any of the reeds 22. Similarly, the slidable harmonica may be moved until the extreme imperforate right hand end or the extreme imperforate left hand end of the plate 18 is at the adjacent opening of the mouthpiece branch 12, thereby to block said branch and preventing the playing of any note of the slidable harmonica.

Normally, however, the holes as 30, 31, 32 and 33 in any one line will conduct air to or from four selected and corresponding reeds 22 to produce a chord. Most of the lines 36 of perforations of the cylinder 15 contain only three holes, as for example, the C major chord, as best seen in Fig. 7. When the mouthpiece 13 is blown into, air is blown into the branch 14 and enters the interior of the valve cylinder through those holes 34 of the cylinder which are adjacent the discharge end of said branch. A circumferentially spaced series of such holes 34 is made around the cylinder, the holes being quite close together. However, if a solid chord blocking portion is provided on the cylinder, all of the holes, including holes 34 are omitted at said portion. When air is drawn in past the lower plate 21a to sound the lower reeds 22, such air passes only through those chord-selecting holes which register with corresponding mouth holes 23, and passes into the interior of the cylinder, thence through the holes 34 into the branch 14. However, during the blowing operation, air blown into the interior of the cylinder through the branch 14 emerges only through those holes as 30—33 adjacent mouth openings 23, the remaining holes being blocked by the solid cylindrical wall part of the frame 24. As shown in Fig. 5, the holes 34 are also blocked at the middle of the harmonica 16. Air discharged into the mouth openings 23 vibrates the reeds of the upper reed plate 21, the reeds 22 of which sound the same corresponding notes as those of the lower plate 21a, whereby the same selected chord is sounded at any setting of the cylinder, either on blowing out or drawing in the breath.

The means employed for turning the valve cylinder and for simultaneously setting the chord indicator will now be described. In the form shown in Figs. 1, 2, 3 and 6, the right hand end of the valve cylinder is reduced in diameter to provide a polygonal non-slip handle 37 which may be grasped between the fingers of the right hand and directly turned through various angles thereby to carry the selected line 36 of chord holes in the cylinder into the operative positions thereof, wherein the respective holes register with corresponding mouth holes 23. The other or left hand end of the cylinder carries the pinion 38 (Fig. 2) meshing with the intermediate gear wheel 39 pivoted to the flat end part of the frame 24 and in turn meshing with the gear segment 40. Said segment is fixed to the shaft 41 pivotally supported by the arms 42 extending from the top of the frame 24, whereby rotation of the cylinder rotates said shaft. Also extending from the top of the frame 24 and long enough so that the end thereof can be easily and clearly seen by the player when the instrument is held to the mouth, is the channel shaped guideway 43 for the slidable indicating scale 44. At the lower end thereof, the scale is provided with a hole 45, into which is inserted one end of the crank arm 46, the other end of which is fixed to the shaft 41. The scale is preferably made of transparent flexible sheet or strip material such as synthetic plastic and at its remote end carries a marker shown in the form of a transverse indicating line 47. The remote end 48 of the guideway is marked with spaced apart graduations 49 and indications giving the chord names or symbols as $C^7$, F, C and the like corresponding to each graduation. For the imperforate part of the valve cylinder blocking the chord player, the indication "Melody" may be used.

The position of the marker 47 of the sliding member 44 of the scale indicates a chord on one of the graduations 49 and also indicates the angular setting of the valve cylinder relatively to the mouth holes 23. Consequently, all the player has to do in addition to playing the slidable harmonica 10 in the usual manner is to turn the handle 37 of the valve cylinder just enough in either direction to bring the marker 47 to that one of the graduations 49 which indicates the chord he wants to play. Such turning of the handle to set the scale automatically carries the proper line of holes 36 into chord playing position and blocks off all of the other chord holes.

In that form of the invention shown in Fig. 4, the pinion 38, gear 39 and segment 40 heretofore described are retained, but are arranged at the right hand end of the frame instead of at the left hand end thereof. The handle 37 is also replaced by a vertically movable spring-pressed plunger 50 arranged in position to be depressed by a finger of the right hand. Said plunger is slidably mounted in a vertical guideway 51 extending from the frame 24 and open at that side thereof adjacent the pinion 38, whereby the rack teeth of the plunger mesh with the pinion. A spring 52 between the head 53 of the plunger and the top of the guideway 51 urges the plunger upwardly until it is stopped by the engagement of the bottom projection 54 thereof with the bottom of the guideway, in which position the marker 47 is at the $C^7$ indication of the scale. Whether the handle 37 or plunger 50 is used as the operating means for the cylinder, it will be seen that only the single control element need be manipulated, which can easily be done by one or more fingers of the user.

It will also be seen that the player has before him, a visible indication of what chord he will play if he blows or draws on the branch 14, so that his attention is not diverted materially from his playing of the slidable harmonica in the usual manner. The player can without training or practice press the plunger 50 or turn the handle 37 to bring the scale marker to any other chord indication as rapidly, accurately and dependably as is required in practice and with a minimum effort. It will further be seen that all of the three or more notes of all the various chords are controlled by the single control member and that the invention greatly simplifies chord playing in harmonicas, reduces the skill required to play such harmonicas to the point where anyone capable of playing the melody can also play the accompaniment, and is well designed for all practical purposes.

While the invention has been illustrated and described in connection with harmonicas playing the melody and corresponding chords in the key of C, it will be understood that sheet music in any of the five common keys is playable with equal facility. All that is required is to change the designations, symbols or names for the chord graduations 49 without making any change in the valve cylinder or in the notes of the various chords or in any other part of the instrument. For example, for the key of G, the chord name for the chord now designated C becomes G; $G^7$ becomes $D^7$; $D^7$ becomes $A^7$; $A^7$ becomes $E^7$; $C^7$ becomes $G^7$; F becomes C and $D_m$ becomes $A_m$. In other words, the chord designations go up in the scale the same interval as G is from C. An indicating strip for the G key, bearing the new chord designations spaced apart the same distances as the corresponding symbols of the C key, would in that case be inserted into the guideway 43 to cover the C key symbols and to expose the new chord names.

It will also be obvious that the positions of the designations and of the marker may be exchanged or reversed. That is, the chord symbols may be placed on the sliding scale 44 instead of on the guideway, and the marker may be made on the guideway instead of on the sliding scale or indicator. In that case, the entire slide or indicator 44 is replaced with another having the correct chord names for the new key in which the music is to be played.

While certain specific forms of the invention have herein been shown and described, it will be obvious that various changes may be made therein without departing from the spirit of the invention defined in the appended claims.

I claim:

1. The combination with a slidable harmonica and a fixed harmonica, of a single member adjacent the fixed harmonica and having a series of lines of spaced apart air passages therethrough, means for movably supporting the member to carry a selected line of passages into communication with the fixed harmonica to play a plurality of notes of the fixed harmonica and thereby to sound a chord, and a common mouthpiece for the harmonicas.

2. A musical instrument comprising a support member, a first harmonica slidably mounted on said support member and having a plurality of longitudinally spaced first ports and corresponding reeds communicating therewith, a first conduit having an outlet opening so disposed that selected ports of said first harmonica may individually be brought into registry therewith, a second harmonica mounted on said support and having a plurality of longitudinally spaced second ports and corresponding reeds communicating therewith, a second conduit communicating with said second harmonica, a chord member having a plurality of different groups of spaced openings which are longitudinally arranged relative to said second harmonica, each of said groups defining a chord and means for selectively bringing individual groups of said openings into registry with respective second ports whereby to effect communication between said respective second ports and said second conduit.

3. A musical instrument as claimed in claim 2, wherein said chord member comprises a rotatable hollow cylindrical valve member in the wall of which said groups of spaced openings are formed along lines parallel to the axis of said cylinder.

4. A musical instrument as claimed in claim 3, wherein a gear is mounted on said cylinder and is rotatable therewith and there is provided a plunger member having a rack portion engaging said gear.

5. A musical instrument as claimed in claim 2, wherein there is provided a common mouthpiece communicating with said first and second conduits.

6. A musical instrument as claimed in claim 2, wherein there are provided means coupled to and actuated by the movement of said chord member to afford a visual indication of the selected group of openings registering with said second ports.

7. A musical instrument as claimed in claim 6, wherein said indicating means includes a guide member disposed forward of and above said chord member, and an indicating scale slidable along said guide member in response to the movement of said chord member.

LOUIS A. RUBEN.

References Cited in the file of this patent

UNITED STATES PATENTS

| Number | Name | Date |
|---|---|---|
| 708,805 | Field et al. | Sept. 9, 1902 |
| 1,518,257 | Dusinberre | Dec. 9, 1924 |
| 1,780,368 | Shaver | Nov. 4, 1930 |
| 1,884,150 | Numberg | Oct. 25, 1932 |
| 2,567,888 | Meyers | Sept. 11, 1951 |

FOREIGN PATENTS

| Number | Country | Date |
|---|---|---|
| 920,726 | France | Jan. 4, 1947 |
| 939,559 | France | Apr. 26, 1948 |